United States Patent
Sato et al.

(10) Patent No.: US 9,780,594 B2
(45) Date of Patent: Oct. 3, 2017

(54) DISCHARGE CIRCUIT AND POWER SUPPLY DEVICE THEREWITH

(71) Applicant: Rohm Co., Ltd., Kyoto (JP)

(72) Inventors: Yoshinori Sato, Kyoto (JP); Manabu Oyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 34 days.

(21) Appl. No.: 14/629,563

(22) Filed: Feb. 24, 2015

(65) Prior Publication Data

US 2015/0263542 A1 Sep. 17, 2015

(30) Foreign Application Priority Data

Mar. 17, 2014 (JP) ................. 2014 053687

(51) Int. Cl.
| | |
|---|---|
| H02M 3/335 | (2006.01) |
| H02J 7/00 | (2006.01) |
| H02J 7/34 | (2006.01) |
| H02M 1/32 | (2007.01) |
| H02M 1/12 | (2006.01) |

(52) U.S. Cl.
CPC .......... *H02J 7/007* (2013.01); *H02J 7/0063* (2013.01); *H02J 7/345* (2013.01); *H02M 1/32* (2013.01); *H02M 3/33523* (2013.01); *H02M 3/33546* (2013.01); *H02J 2007/0067* (2013.01); *H02M 1/126* (2013.01); *H02M 3/33507* (2013.01); *H02M 2001/322* (2013.01)

(58) Field of Classification Search
CPC .................................................... H02M 3/335
USPC ................. 363/21.12, 21.17, 21.15
See application file for complete search history.

(56) References Cited

U.S. PATENT DOCUMENTS

| | | | | |
|---|---|---|---|---|
| 2005/0242983 | A1* | 11/2005 | Fullerton .............. | G01S 7/2926 342/22 |
| 2013/0033236 | A1* | 2/2013 | Li .......................... | H02M 7/219 320/166 |
| 2013/0258722 | A1* | 10/2013 | Wang .................. | H02M 1/4258 363/21.12 |
| 2013/0300387 | A1* | 11/2013 | Louvel ................ | H02M 7/2176 323/282 |
| 2014/0176105 | A1* | 6/2014 | Yamaguchi ............. | H02M 1/08 323/284 |

FOREIGN PATENT DOCUMENTS

JP 2014-017990 1/2014

\* cited by examiner

*Primary Examiner* — Jue Zhang
*Assistant Examiner* — Trinh Dang
(74) *Attorney, Agent, or Firm* — Fish & Richardson P.C.

(57) ABSTRACT

A discharge circuit has a voltage divider arranged to divide an alternating-current input voltage to produce a divided voltage, a high-pass filter arranged to pass a high-frequency component of the divided voltage to produce a monitoring voltage, a comparator arranged to compare the monitoring voltage with a threshold voltage to produce a comparison signal, a timer arranged to generate a timer signal indicating whether or not the comparison signal has been kept at the same logic level for a mask period, a controller arranged to generate a discharge control signal according to the timer signal, and a discharger arranged to discharge, according to the discharge control signal, an X capacitor connected to a node to which the alternating-current input voltage is applied.

13 Claims, 9 Drawing Sheets

DISCHARGE CIRCUIT AND POWER SUPPLY DEVICE THEREWITH

This application is based on Japanese Patent Application No. 2014-053687 filed on Mar. 17, 2014, the contents of which are hereby incorporated by reference.

BACKGROUND OF THE INVENTION

1. Field of the Invention

The present invention relates to a discharge circuit, and to a power supply device incorporating a discharge circuit.

2. Description of Related Art

Figure 9A:
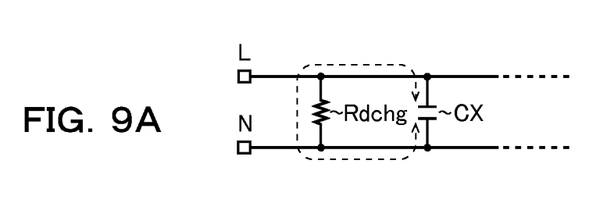
FIGS. 9A and 9B are circuit diagrams showing conventional examples of discharge circuits.

Conventionally, a power supply device that is supplied with an AC (alternating-current) input voltage has, as a means for reducing differential mode noise (also called normal mode noise), an X capacitor CX connected between a line terminal L and a neutral terminal N (see FIG. 9A).

With a power supply device having an X capacitor CX (and an electronic device incorporating it), to protect a user from a serious electric shock hazard who may touch the electric plug just after it is disconnected from a wall receptacle, it is an obligation to meet a discharge standard of the X capacitor CX (IEC 60950-1, IEC 60065, or Japan's Electrical Appliances and Materials Safety Act (Attached Table 8)).

Figure 9B:
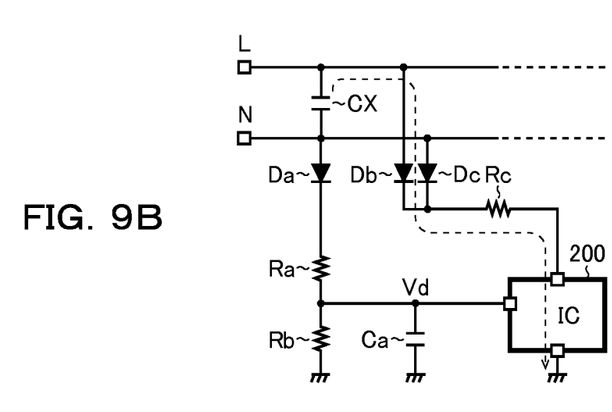

FIGS. 9A and 9B are circuit diagrams of conventional examples of discharge circuits for discharging residual electric charge in an X capacitor CX on an input shut-off. The discharge circuit shown in FIG. 9A includes a discharge resistor Rdchg which is connected in parallel with the X capacitor CX. On the other hand, the discharge circuit shown in FIG. 9B includes a semiconductor device 200 which controls the discharging of the X capacitor CX by monitoring a divided voltage Vd of the AC input voltage.

An example of the above-mentioned conventional technology is seen in JP-A-2014-017990.

In the discharge circuit shown in FIG. 9A, the discharge resistor Rdchg constantly consumes electric power unnecessarily, and this has been hampering power saving (in particular, stand-by power reduction) in power supply devices.

On the other hand, in the discharge circuit shown in FIG. 9B, input voltage dividing resistors Ra and Rb and a noise elimination capacitor Ca constitute an RC time constant circuit, and this results in a dull response of the divided voltage Vd on an input shut-off. Thus, with the semiconductor device 200, which detects an input shut-off by monitoring the DC level of the divided voltage Vd, a delay may arise in the timing of the detection of an input shut-off (and hence in the timing of the start of the discharging of the X capacitor CX), leading in the worst case to a failure to meet the discharge standard mentioned above.

SUMMARY OF THE INVENTION

Devised to address the above-discussed problems found by the present inventors, the invention disclosed herein aims to provide a discharge circuit that can discharge residual electric charge in an X capacitor promptly, and to provide a power supply device incorporating such a discharge circuit.

According to what is disclosed herein, a discharge circuit includes a voltage divider arranged to divide an alternating-current input voltage to produce a divided voltage, a high-pass filter arranged to pass a high-frequency component of the divided voltage to produce a monitoring voltage, a comparator arranged to compare the monitoring voltage with a threshold voltage to produce a comparison signal, a timer arranged to generate a timer signal indicating whether or not the comparison signal has been kept at the same logic level for a mask period, a controller arranged to generate a discharge control signal according to the timer signal, and a discharger arranged to discharge, according to the discharge control signal, an X capacitor connected to a node to which the alternating-current input voltage is applied.

Note that other features, elements, steps, advantages, and characteristics of the invention disclosed in this specification will become more apparent from the description of embodiments given below and the attached drawings.

DETAILED DESCRIPTION OF PREFERRED EMBODIMENTS

Figure 1:
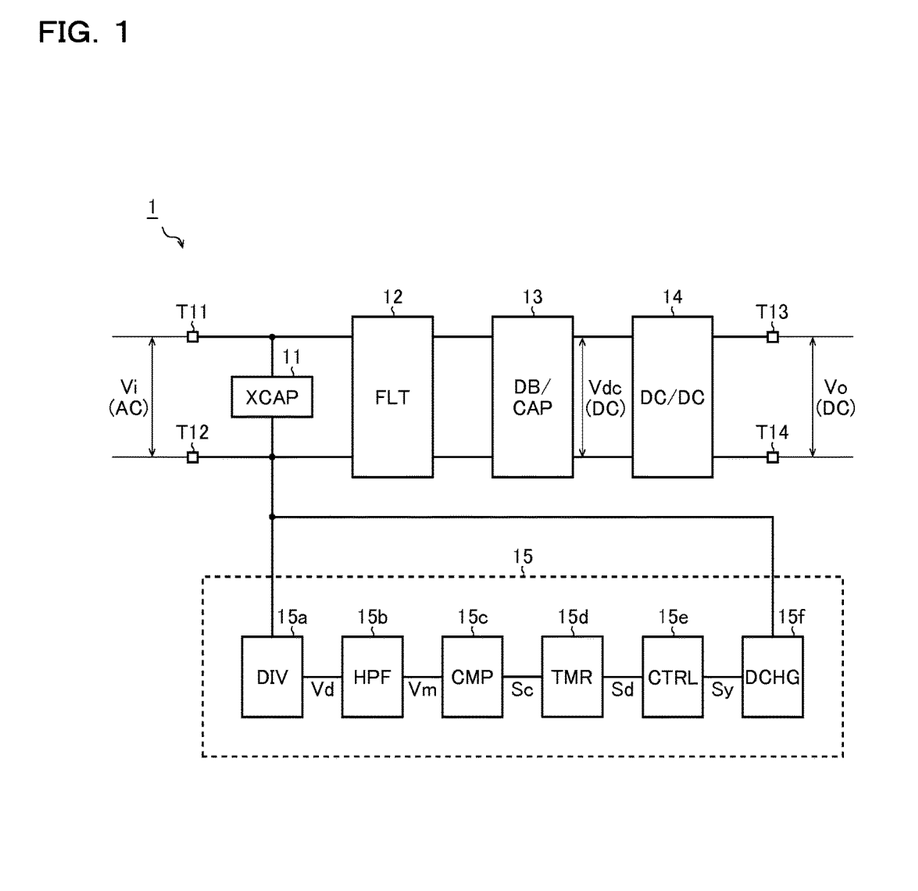
FIG. 1 is a block diagram conceptually showing a configuration of a power supply device 1.

BLOCK DIAGRAM: FIG. 1 is a block diagram conceptually showing a configuration of a power supply device 1 to which the present invention is directed. The power supply device 1 of this configuration example is an AC/DC converter which converts an AC (alternating-current) input voltage Vi into a DC (direct-current) output voltage Vo, and has an X capacitor 11, a filter circuit 12, a rectifying-smoothing circuit 13, a DC/DC converter circuit 14, and a discharge circuit 15.

The X capacitor 11 is connected between a first input terminal (line terminal) T1, to which the AC input voltage Vi is applied, and a second input terminal (neutral terminal) T2. The X capacitor 11 serves to reduce differential mode noise (also called normal mode noise) which is superimposed on the AC input voltage Vi. Used as the X capacitor 11 is, typically, a film capacitor with a comparatively high capacitance. The X capacitor 11 may be provided only in the stage preceding the filter circuit 12, or may be provided in each of the stages preceding and succeeding the filter circuit 12.

The filter circuit 12 eliminates common mode noise from the AC input voltage Vi.

The rectifying-smoothing circuit 13 rectifies and smooths the AC input voltage Vi that has undergone noise elimination by the X capacitor 11 and the filter circuit 12, thereby to produce a DC voltage Vdc.

The DC/DC converter circuit 14 produces, from the DC voltage Vdc, a desired DC output voltage Vo, and outputs the DC output voltage Vo between a first output terminal T13 and a second output terminal T14.

The discharge circuit 15 is a circuit block which, when the input is shut off (e.g., when the electric plug of the power supply device 1 is disconnected from a wall receptacle and the AC input voltage Vi ceases to be supplied), discharges the residual electric charge in the X capacitor 11. The discharge circuit 15 includes a voltage divider 15a, a high-pass filter 15b, a comparator 15c, a timer 15d, a controller 15e, and a discharger 15f.

The voltage divider 15a divides the AC input voltage Vi to produce a divided voltage Vd.

The high-pass filter 15b passes a high-frequency component of the divided voltage Vd (an AC ripple component after half-wave or full-wave rectification) to produce a monitoring voltage Vm. Incidentally, when the power supply device 1 is used in Japan, the cut-off frequency Fc of the high-pass filter 15b can be set at a frequency lower than 100 Hz (i.e., twice as high as the frequency, 50 Hz, of the commercial AC power).

The comparator 15c compares the monitoring voltage Vm with a threshold voltage Vth to generate a comparison signal Sc. For example, the comparison signal Sc is at high level when the monitoring voltage Vm is higher than the threshold voltage Vth, and the comparison signal Sc is at low level when the monitoring voltage Vm is lower than the threshold voltage Vth.

The timer 15d generates a timer signal Sd which indicates whether or not the comparison signal Sc has been kept at the same logic level for a mask period Tm. For example, the timer signal Sd turns to high level when the comparison signal Sc is kept at low level for the mask period Tm (i.e., when a state where the monitoring voltage Vm is lower than the threshold voltage Vth lasts for the mask period Tm).

The controller 15e generates a discharge control signal Sy according to the timer signal Sd. For example, the controller 15e switches the logic level of the discharge control signal Sy to start the discharging of the X capacitor 11 when the timer signal Sd rises to high level.

The discharger 15f discharges the X capacitor 11 according to the discharge control signal Sy.

As described above, in this configuration example, the discharge circuit 15 controls the discharging of the X capacitor 11 not by directly monitoring the DC level of the divided voltage Vd of the AC input voltage Vi, but by monitoring the DC level of the monitoring voltage Vm (AC ripples) produced via the high-pass filter 15b.

With the configuration described above, when the AC input voltage Vi ceases to be supplied and the divided voltage Vd ceases to contain AC ripples, the DC level of the monitoring voltage Vm drops sharply. This advances the timing of the start of the counting of the mask period Tm by the timer 15d, and thus allows the discharging of the X capacitor 11 to be started without delay. How this is achieved will be described in detail below by way of a more specific application.

Figure 2:
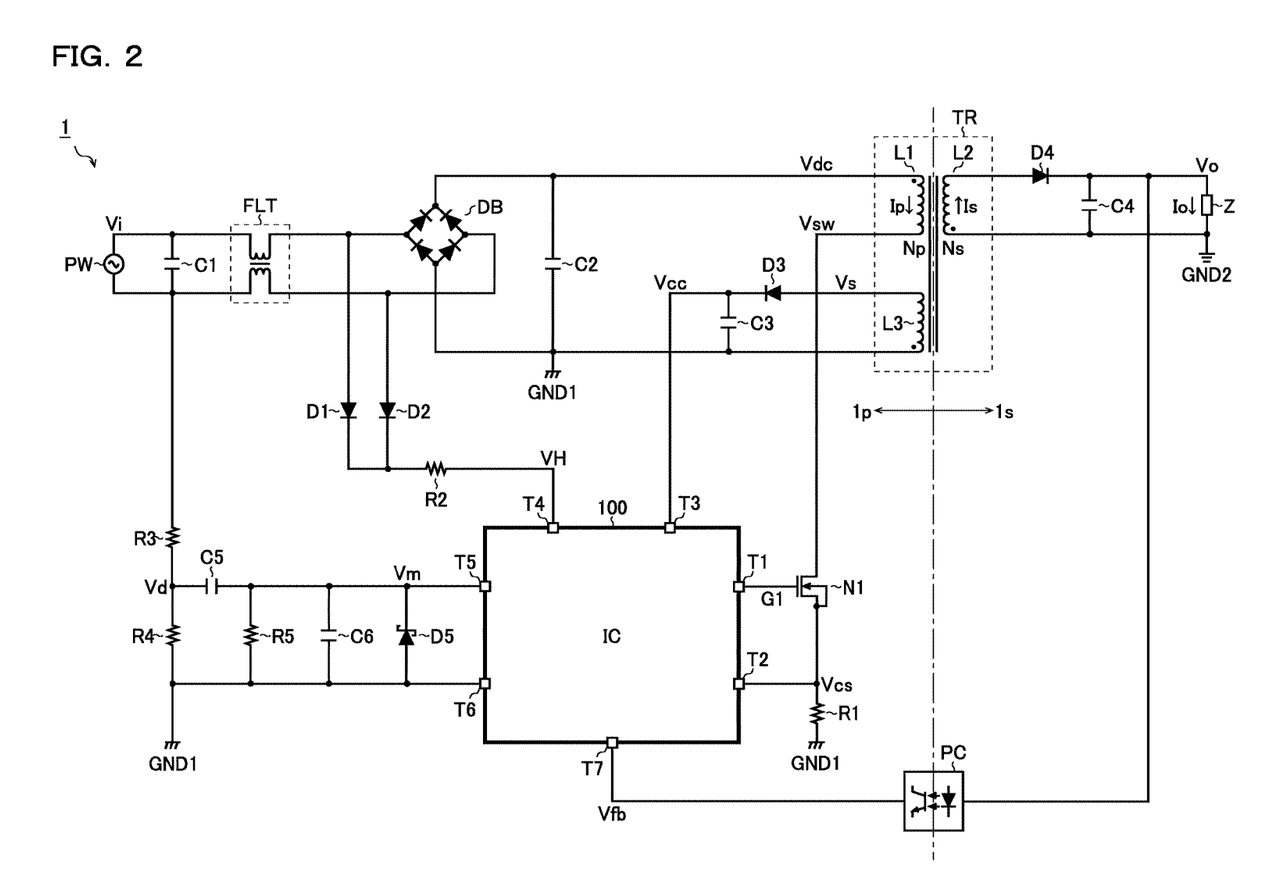
FIG. 2 is an application diagram showing a configuration example of a power supply device 1.

APPLICATION DIAGRAM: FIG. 2 is an application diagram showing a configuration example of the power supply device 1. The power supply device 1 of this configuration example is an isolated AC/DC converter which, while maintaining electrical isolation between a primary circuit system 1p (GND1 system) and a secondary circuit system 1s (GND2 system), converts an AC input voltage Vi supplied from a commercial AC power source PW into a DC output voltage Vo to feed it to a load Z. The power supply device 1 has a semiconductor device 100 and a number of discrete components externally connected to it (a common mode filter FLT, a diode bridge DB, a transformer TR, an N-channel MOS (metal oxide semiconductor) field-effect transistor N1, a photocoupler PC, resistors R1 to R5, capacitors C1 to C6, and diodes D1 o D5).

The capacitor C1 is a component which corresponds to the X capacitor 11 in FIG. 1, and is connected between two input terminals to which the AC input voltage Vi is applied.

The common mode filter FLT is a component which corresponds to the filter circuit 12 in FIG. 1, and, like the capacitor C1, is connected between the two input terminals to which the AC input voltage Vi is applied. The common mode filter FLT includes a ring-shaped core (a ferrite core or an amorphous core) and two coils wound in the same direction around it. A common mode noise current passes through the two coils in the same direction, and thus the magnetic flux it produces in the core boosts itself between the coils. Consequently, the common mode filter FLT exhibits a high impedance to the common mode noise current, impeding its passage.

The diode bridge DB and the capacitor C2 constitute the rectifying-smoothing circuit 13 in FIG. 1. The diode bridge DB applies full-wave rectification to the AC input voltage Vi that has undergone noise elimination by the capacitor C1 and the common mode filter FLT, thereby to produce the DC voltage Vdc. The capacitor C2 is connected between a node to which the DC voltage Vdc is applied and a ground node GND1, and serves to smooth the DC voltage Vdc.

The semiconductor device 100, the transformer TR, the transistor N1, the photocoupler PC, the resistors R1 and R2, the capacitors C3 and C4, and the diodes D1 to D4 constitute the DC/DC converter circuit 14 in FIG. 1.

The semiconductor device 100 is a switching control IC which governs the driving of the transformer TR (and hence governs the control of the DC/DC converter circuit 14), and has integrated into it not only circuit elements for controlling the switching of the transistor N1 but also part of the circuit elements constituting the discharge circuit 15 in FIG. 1 (specifically, the comparator 15c, the timer 15d, the controller 15e, and the discharger 15f). Moreover, the semiconductor device 100 has external terminals T1 to T7 as means for establishing electrical connection with outside the device. Although seven pins are shown in FIG. 2, namely an external terminal T1 (OUT pin), an external terminal 2 (CS pin), an external terminal T3 (VCC pin), an external terminal T4 (VH pin), an external terminal T5 (ACMONI pin), an external terminal T6 (GND pin), and an external terminal T7 (FB pin), there may be provided any other external terminal (e.g., a non-connect pin in FIG. 7). The internal configuration of the semiconductor device 100 will be described in detail later.

The transformer TR includes a primary winding L1 (with Np turns) and a secondary winding L2 (with Ns turns) which are magnetically coupled together with reverse polarities while maintaining electrical isolation between the primary circuit system 1p and the secondary circuit system 1s. A first terminal of the primary winding L1 is connected to a node to which the DC voltage Vdc is applied. A second terminal of the primary winding L1 is connected via the transistor N1 and the resistor R1 to the ground node GND1 of the primary circuit system 1p. A first terminal of the secondary winding L2 is connected to an anode of the diode D4. A cathode of the diode D4 is connected to a node to which the DC output voltage Vo is applied (a power input node of the load Z). A second terminal of the secondary winding L2 is connected to a ground node GND2 of the secondary circuit system 1s. The numbers of turns Np and Ns can be adjusted as appropriate such that the desired DC output voltage Vo is obtained. For example, the larger the number of turns Np, or the smaller the number of turns Ns, the lower the DC output voltage Vo; by contrast, the smaller the number of turns Np, or the larger the number of turns Ns, the higher the DC output voltage Vo. The transformer TR includes, in addition to the primary and secondary windings L1 and L2, an auxiliary winding L3. The auxiliary winding L3 is used to derive a supply voltage Vcc for the semiconductor device 100.

The transistor N1 is a switching element which connects and disconnects (i.e., switches between a conducting and a cut-off states) a current path from the node to which the DC voltage Vdc is applied to the ground node GND1 via the primary winding L1 according to a gate signal G1, thereby to turn on and off a primary current Ip that passes through the primary winding L1. A drain of the transistor N1 is connected to the second terminal of the primary winding L1. A source and a back gate of the transistor N1 are connected via the resistor R1 to the ground node GND1. A gate of the transistor N1 is connected to the external terminal T1 (a node to which the gate signal G1 is applied) of the semiconductor device 100. The transistor N1 is on when the gate signal G1 is at high level, and the transistor N1 is off when the gate signal G1 is at low level.

The resistor R1 is connected between the transistor N1 and the ground node GND1, and acts as a sensing resistor which produces a sensing voltage Vcs commensurate with the primary current Ip. The connection node between the transistor N1 and the resistor R1 (i.e., a node to which the sensing voltage Vcs is applied) is connected to the external terminal T2 of the semiconductor device 100.

The diodes D1 and D2 and the resistor R2 constitute a starting voltage generator which produces a starting voltage VH from the electric power received from a stage preceding the diode bridge DB, and which then feeds the starting voltage VH to the external terminal T4 of the semiconductor device 100. An anode of the diode D1 and an anode of the diode D2 are connected to a first output terminal and a second output terminal, respectively of the common mode filter FLT. The anodes of the diodes D1 and D2 may instead be connected to a first input terminal and a second input terminal, respectively, of the common mode filter FLT. A cathode of the diode D1 and a cathode of the diode D2 are both connected to a first terminal of the resistor R2. A second terminal of the resistor R2 is connected to the external terminal T4 of the semiconductor device 100.

The diode D3 and the capacitor C3 constitute a supply voltage generator which produces from an induction voltage Vs in the auxiliary winding L3 a supply voltage Vcc for the semiconductor device 100, and which then feeds the supply voltage Vcc to the external terminal T3 of the semiconductor device 100. An anode of the diode D3 is connected to a first terminal of the auxiliary winding L3. A cathode of the diode D3 is connected to a first terminal of the capacitor C3 and to the external terminal T3 of the semiconductor device 100. A second terminal of the auxiliary winding L3 and a second terminal of the capacitor C3 are both connected to the ground node GND1. The winding ratio between the primary winding L1 and the auxiliary winding L3 can be set as appropriate based on the supply voltage Vcc that the semiconductor device 100 requires to operate.

The diode D4 and the capacitor C4 constitute an output rectifier-smoother which rectifies and smooths an induction voltage in the secondary winding L2 to produce the DC output voltage Vo. An anode of the diode D4 is connected to the first terminal of the secondary winding L2. A cathode of the diode D4 and a first terminal of the capacitor C4 are both connected to the node to which the DC output voltage Vo is applied. A second terminal of the capacitor C4 is connected to the ground node GND2.

The photocoupler PC, while maintaining electrical isolation between the primary circuit system 1p (GND1 system) and the secondary circuit system 1s (GND2 system), produces a feedback voltage Vfb commensurate with the DC output voltage Vo and feeds the feedback voltage Vfb to the external terminal T7 of the semiconductor device 100. The feedback voltage Vfb is higher the higher the DC output voltage Vo, and the feedback voltage Vfb is lower the lower the DC output voltage Vo.

The resistors R3 and R4 constitute the voltage divider 15a in FIG. 1. A first terminal of the resistor R3 is connected to the node to which the AC input voltage Vi is applied. A second terminal of the resistor R3 and a first terminal of the resistor R4 are both connected to a node to which the divided voltage Vd is fed. A second terminal of the resistor R4 is connected to the ground node GND1. The lower the resistance of the resistor R3, the lower the efficiency; thus, for high efficiency, it is preferable to give the resistor R3 as high a resistance as possible. However, an excessively high resistance in the resistor R3 causes a reduction in the current through the resistor R3 and hence a shortage in the electric charge fed to the capacitor C5, making the amplitude of the monitoring voltage Vm too small to exceed the threshold voltage Vth. Accordingly, it is preferable that the resistor R3 be given a resistance determined so as to achieve a satisfactory trade-off On the other hand, on an AC basis, the second terminal of the resistor R3 has the resistors R4 and R5 connected to it in parallel. Here, the resistance of the resistor R5 is lower than the resistance of the resistor R4; thus the resistor R5 is more dominant than the resistor R4 in the determination of the amplitude of the monitoring voltage Vm. Accordingly, the resistor R4 can be given a reasonably high resistance without causing a problem.

The capacitor C5 and the resistor R5 constitute the high-pass filter 15b in FIG. 1. A first terminal of the capacitor C5 is connected to the node to which the divided voltage Vd is applied (the connection node between the resistors R3 and R4). The connection node between a second terminal of the capacitor C5 and a first terminal of the resistor R5 (corresponding to the node to which the monitoring voltage Vm is fed) is connected to the external terminal T5 of the semiconductor device 100. A second terminal of the resistor R5 is connected to the ground node GND1. The resistor R5 may be integrated into the semiconductor device 100.

To produce the monitoring voltage Vm, the AC ripples (at 100 Hz or 120 Hz) in the divided voltage Vd need to be allowed to pass unattenuated. Accordingly, it is preferable that the capacitance of the capacitor C5 and the resistance of the resistor R5 be so determined that the cut-off frequency Fc ($=1/(2\pi \times C5 \times R5)$) of the high-pass filter 15b is lower than 100 Hz (twice as high as the frequency, 50 Hz, of the commercial AC power). However, the lower the capacitance of the capacitor C5, the higher the impedance of the high-pass filter 15b, and thus the more the monitoring voltage Vm is attenuated. It is therefore preferable to give the capacitor C5 a reasonably high capacitance.

With the configuration described above where the DC level of the monitoring voltage Vm (AC ripples) is monitored by the semiconductor device 100, the semiconductor device 100 can detect a drop in the DC level of the monitoring voltage Vm without delay to start the discharging of the capacitor C1. The residual electric charge in the capacitor C1 is discharged also across a path via the resistor R5. Accordingly, the lower the resistance of the resistor R5, the higher the speed at which the monitoring voltage Vm falls on an input shut-off, and hence the earlier the semiconductor device 100 starts to discharge the capacitor C1.

The capacitor C6 is a noise elimination capacitor connected between the external terminal T5 (the node to which the monitoring voltage Vm is applied) and the ground node GND1. Capacitively coupled with the capacitor C5, the external terminal T5 has a high impedance. To prevent erroneous operation due to noise, it is preferable that the capacitor C6 be connected between the external terminal T5 and the ground node GND1. The capacitor C6 may be integrated into the semiconductor device 100.

The diode D5 is a Schottky barrier diode of which a cathode is connected to the external terminal T5 (the node to which the monitoring voltage Vm is applied) and of which an anode is connected to the ground node GND1. The monitoring voltage Vm swings to a negative potential, and thus feeding the monitoring voltage Vm as it is to the semiconductor device 100 may cause erroneous operation of the semiconductor device 100. To prevent erroneous operation of the semiconductor device 100, it is preferable that the diode D5 be connected between the external terminal T5 and the ground node GND1. It is also conceivable, instead, to keep the monitoring voltage Vm from falling to a negative potential by providing a rectifier diode Da as shown in FIG. 9B. However, a rectifier diode Da connected directly to the node to which the AC input voltage Vi is applied is required to have a high withstand voltage; in contrast, a diode D5 connected to the external terminal T5 of the semiconductor device 100 has only to have a low withstand voltage. Thus, using the diode D5 is more advantageous in reducing cost and reducing variations in characteristics. The diode D5 may be integrated into the semiconductor device 100.

Figure 3:
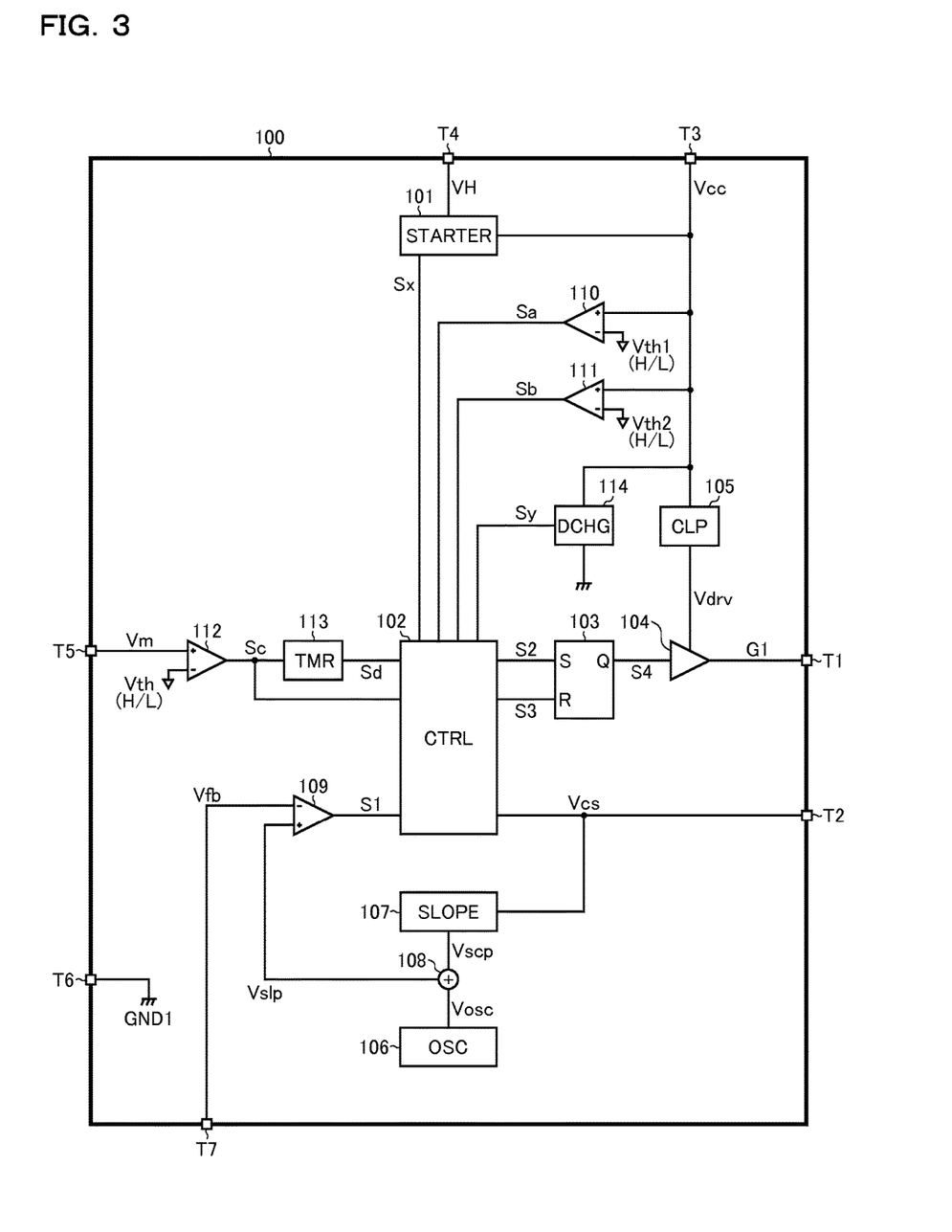
FIG. 3 is a block diagram showing a configuration example of a semiconductor device 100.

SEMICONDUCTOR DEVICE: FIG. 3 is a block diagram showing a configuration example of the semiconductor device 100. The semiconductor device 100 of this configuration example has integrated into it a starter circuit 101, a control circuit 102, an RS flip-flop 103, a driver circuit 104, a clamp circuit 105, an oscillator circuit 106, a slope compensation circuit 107, an adder circuit 108, comparator circuits 109 to 112, a timer circuit 113, and a discharge circuit 114. The semiconductor device 100 may have any other circuit block other than those just enumerated integrated into it (such as an overvoltage protection circuit, an overheat protection circuit, and a soft-start circuit).

The starter circuit 101 charges the supply voltage Vcc by using the starting voltage VH applied to the external terminal T4 when the power supply device 1 starts up or when the supply voltage Vcc drops. The operation of the starter circuit 101 for the charging of the supply voltage Vcc is controlled with a charge control signal Sx from the control circuit 102, and this will be described in detail later.

The control circuit 102 governs the control of the operation of the semiconductor device 100 in a centralized fashion. For example, the control circuit 102 operates as follows: it performs DC/DC control (on/off control of the transistor N1) to obtain the desired DC output voltage Vo by generating an on signal S2 and an off signal S3 according to a PWM (pulse width modulation) signal S1. The control circuit 102 also has a function of, on detecting a rise in the monitoring voltage Vm according to the comparison signal Sc, starting the DC/DC control and, on detecting a continuous fall in the monitoring voltage Vm according to the timer signal Sd, stopping the DC/DC control (a so-called blank-out function). In a case where the blank-out function is not used, a voltage higher than the threshold voltage Vth in the comparator circuit 112 can be constantly applied to the external terminal T5. The control circuit 102 also generates a charge control signal Sx and a discharge control signal Sy to control the charging and discharging of the supply voltage Vcc according to comparison signals Sa and Sb. It is however only the timer signal Sd is at high level that the charging of the supply voltage Vcc is enabled. That is, the control circuit 102 has a function corresponding to the controller 15e in FIG. 1. The control circuit 102 further has a function of stopping the DC/DC control when the external terminal T2 is open.

The RS flip-flop 103 switches the logic level of a drive signal S4, which the RS flip-flop 103 outputs at an output terminal (Q), according to the on signal S2, which is fed to a set terminal (S) of the RS flip-flop 103, and the off signal S3, which is fed to a reset terminal (R) of the RS flip-flop 103. More specifically, the RS flip-flop 103 sets the drive signal S4 to high level at a rising edge in the on signal S2, and resets the drive signal S4 to low level at a rising edge in the off signal S3.

The driver circuit 104 generates the gate signal G1 according to the drive signal S4, and feeds the gate signal G1 to the external terminal T1. The gate signal G1 is at high level when the drive signal S4 is at high level, and the gate signal G1 is at low level when the drive signal S4 is at low level.

The clamp circuit 105 clamps the supply voltage Vcc applied to the external terminal T3 at a predetermined level (e.g., 12.5 V), thereby to produce a drive voltage Vdrv (corresponding to the high-level voltage of the gate signal G1) which is supplied to the driver circuit 104. Providing the clamp circuit 105 helps prevent gate breakdown in the transistor N1 resulting from an abnormal rise in the supply voltage Vcc.

The oscillator circuit 106 generates an oscillating voltage Vosc at a predetermined frequency.

The slope compensation circuit 107 generates a slope compensation voltage Vscp commensurate with the sensing voltage Vcs applied to the external terminal T2.

The adder circuit 108 adds up the oscillating voltage Vosc and the slope compensation voltage Vscp to produce a slope voltage Vslp having a triangular (or saw-toothed) waveform.

The comparator circuit 109 compares the slope voltage Vslp, which is applied to a non-inverting input terminal (+) of the comparator circuit 109, with the feedback voltage Vfb, which is applied to an inverting input terminal (−) of the comparator circuit 109, to generate the PWM signal S1. The PWM signal S1 is at high level when the slope voltage Vslp is higher than the feedback voltage Vfb, and the PWM signal S1 is at low level when the slope voltage Vslp is lower than the feedback voltage Vfb. Thus, the on duty (the proportion of the high-level period in one cycle) of the PWM signal Si is higher the lower the feedback voltage Vfb, and is lower the higher the feedback voltage Vfb.

The comparator circuit 110 compares the supply voltage Vcc, which is applied from the external terminal T3 to a non-inverting input terminal (+) of the comparator circuit 110, with a threshold voltage Vth1 for UVLO (undervoltage locked-out) detection, which is applied to an inverting input terminal (−) of the comparator circuit 110, to generate a comparison signal Sa. The threshold voltage Vth1 has two-level hysteresis involving a high and a low level such that, every time the logic level of the comparison signal Sa switches, the threshold voltage Vth1 switches to one of an upper threshold level Vth1H and a lower threshold level Vth1L (where Vth1L<Vth1H).

Specifically, when the comparison signal Sa is at low level, the threshold voltage Vth1 is at the upper threshold level Vth1H. Thus, unless the supply voltage Vcc exceeds the upper threshold level Vth1H, the comparison signal Sa is kept at low level. Meanwhile, the DC/DC control by the control circuit 102 remains disabled. On the other hand, when the supply voltage Vcc exceeds the upper threshold level Vth1H, the comparison signal Sa rises to high level, and the threshold voltage Vth1 is switched to the lower threshold level Vth1L. Thus, thereafter, unless the supply voltage Vcc falls below the lower threshold level Vth1L, the comparison signal Sa is kept at high level. Meanwhile, the DC/DC control by the control circuit 102 remains enabled.

The comparator circuit 111 compares the supply voltage Vcc, which is applied from the external terminal T3 to a non-inverting input terminal (+) of the comparator circuit 111, with a threshold voltage Vth2 for charge/discharge switching, which is applied to an inverting input terminal (−) of the comparator circuit 111, to generate a comparison signal Sb. The threshold voltage Vth2 has two-level hysteresis involving a high and a low level such that, every time the logic level of the comparison signal Sb switches, the threshold voltage Vth2 switches to one of an upper threshold level Vth2H and a lower threshold level Vth2L (where Vth1L<Vth2L<Vth2H<Vth1H).

Specifically, when the comparison signal Sb is at low level, the threshold voltage Vth2 is at the upper threshold level Vth2H. Thus, unless the supply voltage Vcc exceeds the upper threshold level Vth2H, the comparison signal Sb is kept at low level. On the other hand, when the supply voltage Vcc exceeds the upper threshold level Vth2H, the comparison signal Sb rises to high level, and the threshold voltage Vth2 switches to the lower threshold level Vth2L. Thus, thereafter, unless the supply voltage Vcc falls below the lower threshold level Vth2L, the comparison signal Sb is kept at high level. How the charging and discharging of the supply voltage Vcc are controlled according to the comparison signal Sb will be described later.

The comparator circuit 112 is a circuit element which corresponds to the comparator 15c in FIG. 1. The comparator circuit 112 compares the monitoring voltage Vm, which is applied from the external terminal T5 to a non-inverting input terminal (+) of the comparator circuit 112, with the threshold voltage Vth for AC monitoring, which is applied to an inverting input terminal (−) of the comparator circuit 112, to generate a comparison signal Sc. The threshold voltage Vth has two-level hysteresis involving a high and a low level such that, every time the logic level of the comparison signal Sc switches, the threshold voltage Vth switches to one of an upper threshold level VthH and a lower threshold level VthL (where VthL<VthH).

Specifically, when the comparison signal Sc is at low level, the threshold voltage Vth is at the upper threshold level VthH. Thus, unless the monitoring voltage Vm exceeds the upper threshold level VthH, the comparison signal Sc is kept at low level. On the other hand, when the monitoring voltage Vm exceeds the upper threshold level VthH, the comparison signal Sc rises to high level, and the threshold voltage Vth switches to the lower threshold level VthL. Thus, thereafter, unless the monitoring voltage Vm falls below the lower threshold level VthL, the comparison signal Sc is kept at high level.

The timer circuit 113 is a circuit element which corresponds to the timer 15d in FIG. 1. The timer circuit 113 raises the timer signal Sd to high level when the comparison signal Sc is kept at low level for a mask period (e.g., 256 milliseconds). Usable as the timer circuit 113 is a counter of which the counting operation is reset when the comparison signal Sc is at high level.

The discharge circuit 114 is a circuit element which corresponds to the discharger 15f in FIG. 1. The discharge circuit 114 discharges the supply voltage Vcc to the ground node GND1 when the AC input voltage Vi ceases to be supplied. The operation of the discharge circuit 114 for the discharging of the supply voltage Vcc is controlled with a discharge control signal Sy from the control circuit 102, and this will be described in detail later.

DC/DC OPERATION: With reference to FIGS. 2 and 3, the DC/DC operation governed by the semiconductor device 100 will be described. When a pulse appears in the on signal S2, the gate signal G1 turns to high level, and the transistor N1 turns on. During the on period of the transistor N1, a primary current Ip passes from the node to which the DC voltage Vdc is applied to the ground node GND1 via the primary winding L1, the transistor N1, and the resistor R1, and thus electrical energy is stored in the primary winding L1.

Thereafter, when a pulse appears in the off signal S3, the gate signal G1 turns to low level, and the transistor N1 turns off. During the off period of the transistor N1, an induction voltage appears in the secondary winding L2, which is magnetically coupled with the primary winding L1, and thus a secondary current 1s passes from the secondary winding L2 to the ground node GND2 via the diode D4. Meanwhile, the load Z is fed with the DC output voltage Vo, which is obtained by applying half-wave rectification to the induction voltage in secondary winding L2.

Thereafter, as pulses appear in the on and off signals S2 and S3 according to the PWM signal S1, switching control operation basically similar to that described above is repeated.

As described above, with the power supply device 1 of this configuration example, it is possible, while maintaining electrical insulation between the primary circuit system 1p and the secondary circuit system 1s, to generate from an AC input voltage Vi a DC output voltage Vo and feeds the DC output voltage Vo to a load Z. Incidentally, the power supply device 1 of this configuration example adopts a flyback design, which requires less components than a forward design, which requires a smoothing inductor; and is therefore more advantageous in reducing cost. This, however, is not meant to limit the configuration of the DC/DC converter circuit; it may instead be a non-isolated type which does not use a transformer TR.

Figure 4:
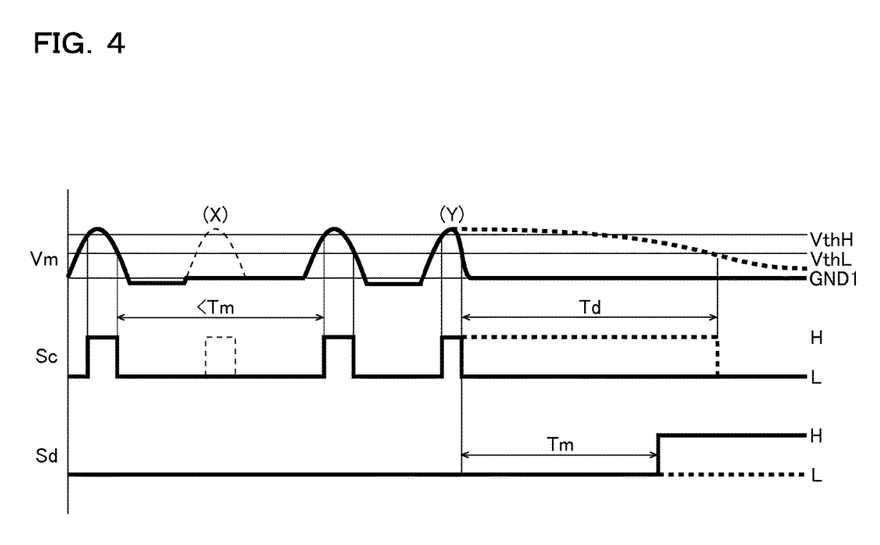
FIG. 4 is a timing chart showing an example of operation for detecting an input shut-off.

INPUT SHUT-OFF DETECTION: FIG. 4 is a timing chart showing an example of operation for detecting an input shut-off, depicting, from top, the monitoring voltage Vm, the comparison signal Sc, and the timer signal Sd. As mentioned previously, the comparison signal Sc turns to high level when the monitoring voltage Vm exceeds the upper threshold level VthH, and the comparison signal Sc turns to low level when the monitoring voltage Vm falls below the upper threshold level VthL.

Figure 7:
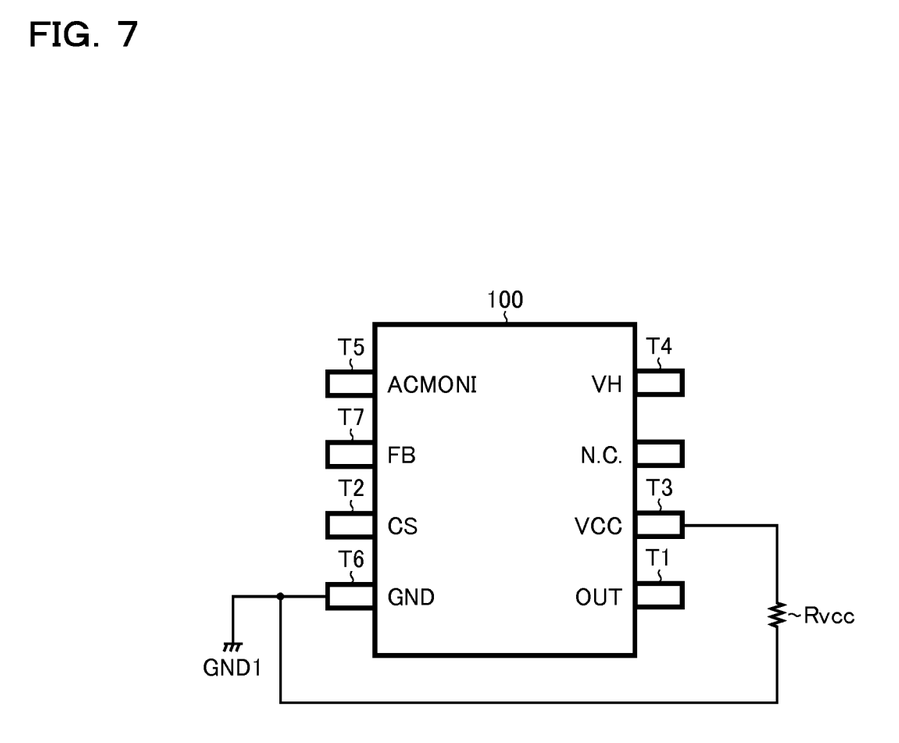
FIG. 7 is an application diagram showing an example of a discharge assist resistor Rvcc inserted.

When an instantaneous interruption occurs in the AC input voltage Vi (an instantaneous blackout), as depicted at point (X) in FIG. 7, it may cause a missing pulse (indicated by fine broken lines) in the comparison signal Sc, and the comparison signal Sc is then kept at low level longer than usual. However, if the instantaneous interruption in the AC input voltage ends promptly enough to allow the comparison signal Sc to rise to high level before the lapse of the mask period Tm, the timer signal Sd remains at low level. Thus, a minor trouble like an instantaneous interruption in the AC input voltage Vi will not lead to unnecessary discharging of the capacitor C1.

In contrast, when the electric plug of the power supply device 1 is disconnected from the wall receptacle and the supply of the AC input voltage Vi is shut off, as depicted at point (Y) in FIG. 7, the DC level of the monitoring voltage Vm falls sharply below the lower threshold level VthL, thereafter leaving the monitoring voltage Vm stuck to the ground node GND1. As a result, at the lapse of the mask period Tm after the fall of the comparison signal Sc to low level, the timer signal Sd rises to high level, and the semiconductor device 100 starts the discharging of the capacitor C1.

If, for the sake of discussion, the conventional configuration shown in FIG. 9B is adopted, as indicated by thick broken lines in FIG. 7, even after the supply of the AC input voltage Vi is shut off at point (Y), the monitoring voltage Vm procrastinates until falling below the lower threshold level VthL, causing a delay Td in the timing of the start of the counting of the mask period Tm (and hence the timing of the start of the discharging of the capacitor C1). By contrast, when the present configuration example shown in FIG. 2 is adopted, at point (Y), the DC level of the monitoring voltage Vm drops sharply, and this permits the discharging of the capacitor C1 to be started without delay.

Figure 5:
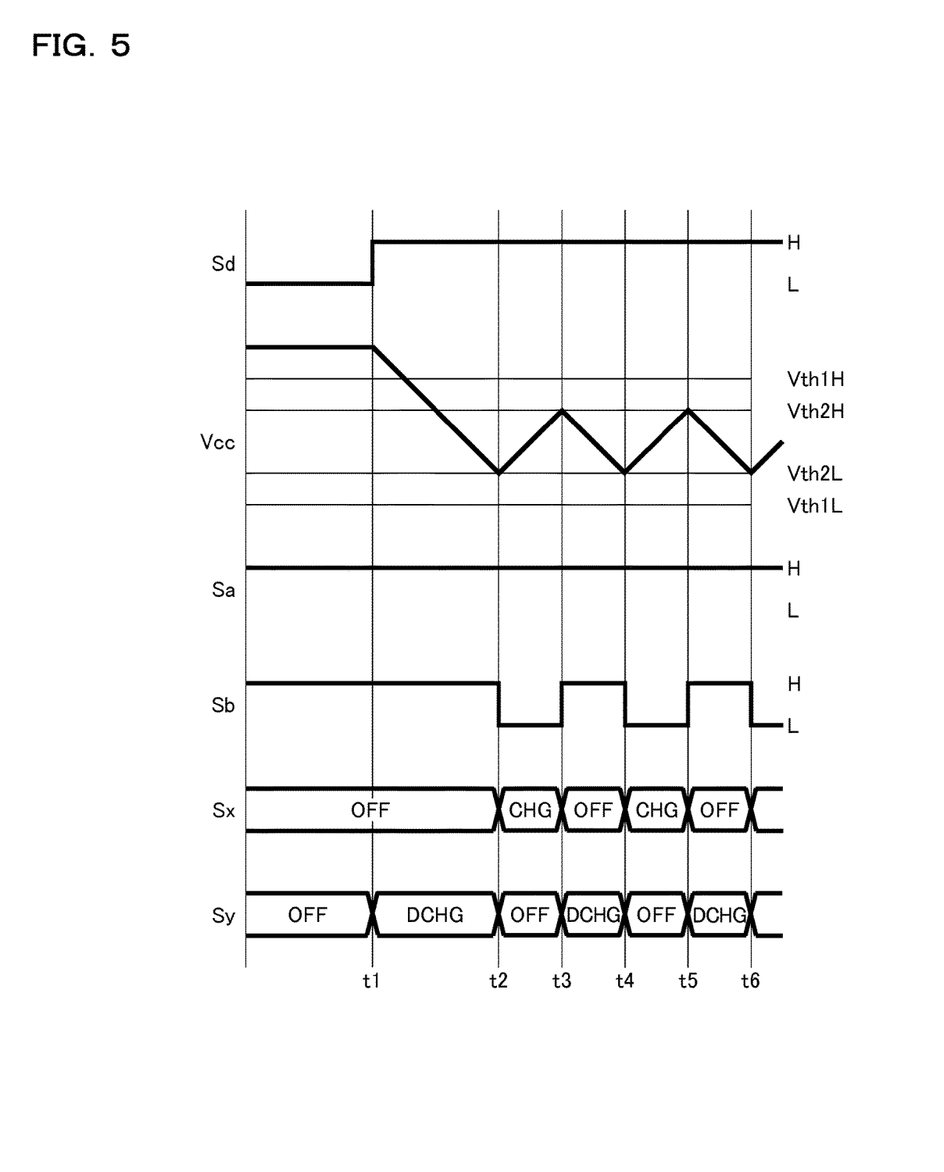
FIG. 5 is a timing chart showing an example of operation for charging and discharging the supply voltage Vcc.

CHARGING/DISCHARGING OF SUPPLY VOLTAGE Vcc: FIG. 5 is a timing chart showing an example of operation for charging and discharging the supply voltage Vcc, depicting, from top, the timer signal Sd, the supply voltage Vcc, the comparison signals Sa and Sb, the charge control signal Sx, and the discharge control signal Sy.

Up to time point t1, the timer signal Sd is kept at low level. Meanwhile, the control circuit 102 keeps the discharge control signal Sy at a logic level for discharge-off, and the discharging of the supply voltage Vcc by the discharge circuit 114 is disabled. Moreover, up to time point t1, the supply voltage Vcc is higher than the upper threshold level Vth1H, and the comparison signals Sa and Sb are both kept at high level. Meanwhile, the control circuit 102 keeps the charge control signal Sx at a logic level for charge-off, and the charging of the supply voltage Vcc by the starter circuit 101 is disabled.

At time point t1, when the timer signal Sd rises to high level, the control circuit 102 turns the discharge control signal Sy to a logic level for discharge-on to make the discharge circuit 114 start the discharging of the supply voltage Vcc (the discharging of the capacitor C2). As a result, starting at time point t1, the supply voltage Vcc starts to fall. However, up to time point t2, the supply voltage Vcc is higher than the lower threshold level Vth2L, and the comparison signals Sa and Sb are both kept at high level. Accordingly, the control circuit 102 keeps the charge control signal Sx at the logic level for charge-off, and thus the charging of the supply voltage Vcc by the starter circuit 101 remains disabled.

At time point t2, when the supply voltage Vcc falls below the lower threshold level Vth2L and the comparison signal Sb drops to low level, the control circuit 102, on one hand, turns the discharge control signal Sy to the logic level for discharge-off to make the discharge circuit 114 stop the discharging of the supply voltage Vcc and, on the other hand, turns the charge control signal Sx to a logic level for charge-on to make the starter circuit 101 start the charging of the supply voltage Vcc (corresponding to the transfer of electric charge from the capacitor C1 to the capacitor C3). As a result, starting at time point t2, the supply voltage Vcc starts to rise. However, up to time point t3, the supply voltage Vcc is lower than the upper threshold level Vth2H, and the comparison signal Sb is kept at low level. On the other hand, the supply voltage Vcc starts to rise before falling below the lower threshold level Vth1L, and this prevents the comparison signal Sa from dropping to low level and hence prevents the power supply device 1 from being shut down by UVLO detection.

At time point t3, when the supply voltage Vcc exceeds the upper threshold level Vth2H and the comparison signal Sb rises to high level, the control circuit 102, on one hand, once again turns the discharge control signal Sy to the logic level for discharge-on to make the discharge circuit 114 start the discharging of the supply voltage Vcc and, on the other hand, turns the charge control signal Sx to the logic level for charge-off to make the starter circuit 101 stop the charging of the supply voltage Vcc. As a result, starting at time point t3, the supply voltage Vcc once again starts to fall.

Likewise, after time point t4, the control circuit 102 repeats the discharging of the supply voltage Vcc by the discharge circuit 114 and the charging of the supply voltage Vcc by the starter circuit 101, thereby to discharge the residual electric charge in the capacitor C1.

Figure 6A:
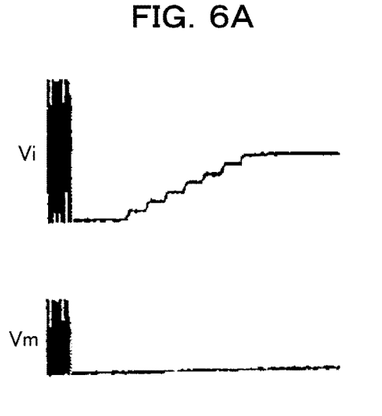
FIGS. 6A and 6B are waveform diagrams showing behavior, as observed at an input shut-off, of an AC input voltage Vi and a monitoring voltage Vm.
Figure 6B:
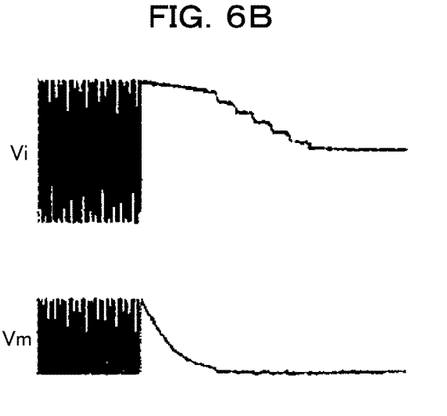

FIGS. 6A and 6B are waveform diagrams showing the behavior, as observed on an input shut-off, of the AC input voltage Vi (after the input shut-off, substituted by the voltage across the capacitor C1 (residual electric charge)) and the monitoring voltage Vm. While FIG. 6A shows the discharge behavior observed on an input shut-off with the AC input voltage Vi swung to the most negative potential, FIG. 6B shows the discharge behavior observed on an input shut-off with the AC input voltage Vi swung to the most positive potential.

As shown in FIGS. 6A and 6B, after an input shut-off, the charging and discharging of the supply voltage Vcc described above are repeated, so that the voltage across the capacitor C1 falls stepwise. In the discharge behavior shown in FIG. 6A, the voltage across the capacitor C1 falls by 37% in 500 milliseconds; in the discharge behavior shown in FIG. 6B, the voltage across the capacitor C1 falls by 37% in 550 milliseconds. These results of evaluation more than meet different discharge standards (IEC 60950-1, IEC 60065, and Japan's Electrical Appliances and Materials Safety Act (Attached Table 8)).

DISCHARGE ASSIST RESISTOR: FIG. 7 is an application diagram showing an example of a discharge assist resistor Rvcc inserted. The discharge circuit 114 integrated into the semiconductor device 100 has limited discharge performance due to, among others, the limited device size. Thus, with a high-capacitance capacitor C1, the discharge circuit 114 alone may not meet the discharge standard of the capacitor C1.

In such cases, it is effective to externally connect a discharge assist resistor Rvcc between the external terminals T3 and T6 (VCC pin and GND pin respectively) of the semiconductor device 100. Providing the discharge assist resistor Rvcc helps discharge the supply voltage Vcc more quickly. Specifically, back in FIG. 5, providing the discharge assist resistor Rvcc helps shorten the discharge periods of the supply voltage Vcc (between time points t1 and t2, between time points t3 and t4, and between time points t5 and t6). Thus, even with a high-capacitance capacitor C1, it is possible to meet a discharge standard. Since the supply voltage Vcc is sufficiently low compared with the AC input voltage Vi, the power loss through the discharge assist resistor Rvcc is quite small, unlike in the conventional configuration employing a discharge resistor Rdchg (see FIG. 9A).

Figure 8:
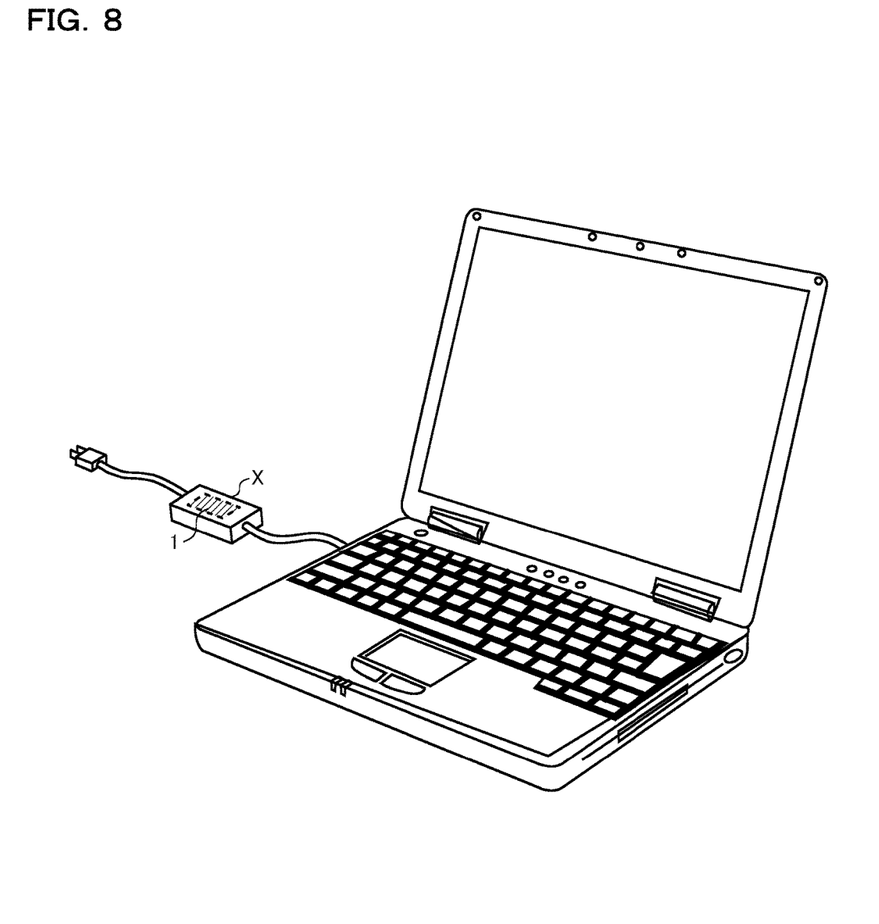
FIG. 8 is an exterior view of an AC adaptor.

APPLICATION TO AC ADAPTOR: FIG. 8 is an exterior view of an AC adaptor X. As shown there, with an AC adaptor X incorporating the power supply device 1 described above, even when the electric plug is disconnected from the wall receptacle, the residual electric charge in the X capacitor can be discharged quickly. Thus, it is possible to meet all different discharge standards (IEC 60950-1, IEC 60065, and Japan's Electrical Appliances and Materials Safety Act (Attached Table 8)).

Needless to say, the power supply device 1 finds applications not only in AC adaptors X but also in a variety of electronic devices (televisions, personal computers, printers, etc.) which are supplied with electric power directly from a commercial AC power source.

MODIFICATIONS: The different technical features according to the present invention disclosed herein, described by way of embodiments above, allow for various modifications without departing from the spirit of the invention. That is, the embodiments described above should be understood to be in every aspect merely illustrative and not restrictive; the technical scope of the present invention is defined not by the description of those specific embodiments but by the appended claims, and should be understood to encompass any modifications made in the sense and scope equivalent to those of the claims.

INDUSTRIAL APPLICABILITY: The present invention finds applications in power supply devices in general which have an X capacitor.

What is claimed is:

1. A discharge circuit comprising:
   a voltage divider arranged to divide an alternating-current input voltage to produce a divided voltage;
   a high-pass filter arranged to pass a high-frequency component of the divided voltage to produce a monitoring voltage;
   a comparator arranged to compare the monitoring voltage with a threshold voltage to produce a comparison signal;
   a timer arranged to generate a timer signal indicating whether or not the comparison signal has been kept at a same logic level for a mask period;
   a controller arranged to generate a discharge control signal according to the timer signal; and
   a discharger arranged to discharge, according to the discharge control signal, an X capacitor connected to a node to which the alternating-current input voltage is applied,
   wherein the voltage divider includes:
      a first resistor connected between a node to which the alternating-current input voltage is applied and a node to which the divided voltage is applied; and
      a second resistor connected between the node to which the divided voltage is applied and a ground node, and
   wherein the high-pass filter includes:
      a first capacitor connected between the node to which the divided voltage is applied and a node to which the monitoring voltage is applied; and
      a third resistor connected between the node to which the monitoring voltage is applied and the ground node,
   wherein the resistance of the third resistor is lower than the resistance of the second resistor,
   wherein a magnitude of an alternating-current component of the divided voltage is determined by a ratio of a resistance of the first resistor to a combined resistance of the second and third resistors, the alternating-current component being fed to the comparator via the first capacitor, and
   wherein a magnitude of a direct-current component of the divided voltage is determined by a ratio of the resistance of the first resistor to the resistance of the second resistor irrespective of the third resistor, the direct-current component passing to the ground node via the first and second resistors and being isolated from the comparator by the first capacitor.

2. The discharge circuit according to claim 1, further comprising:
   a second capacitor connected across both terminals of the third resistor for noise elimination, wherein
   the second capacitor is discharged by the third resistor, and is isolated from the second resistor by the first capacitor on a direct-current basis.

3. The discharge circuit according to claim 1, further comprising:
   a Schottky barrier diode of which a cathode is connected to the node to which the monitoring voltage is applied and of which an anode is connected to the ground node.

4. The discharge circuit according to claim 1, wherein the high-pass filter has a cut-off frequency lower than 100 Hz.

5. The discharge circuit according to claim 2, further comprising:
   a Schottky barrier diode of which a cathode is connected to the node to which the monitoring voltage is applied and of which an anode is connected to the ground node.

6. The discharge circuit according to claim 2, wherein the high-pass filter has a cut-off frequency lower than 100 Hz.

7. The discharge circuit according to claim 3, wherein the high-pass filter has a cut-off frequency lower than 100 Hz.

8. A power supply device comprising:
   an X capacitor connected to a node to which an alternating-current input voltage is applied;
   a filter circuit arranged to eliminate noise from the alternating-current input voltage;
   a rectifying-smoothing circuit arranged to rectify and smooth the alternating-current input voltage having undergone noise elimination so as to produce a direct-current voltage;
   a DC/DC convertor circuit arranged to produce from the direct-current voltage a desired direct-current output voltage; and
   a discharge circuit comprising:
      a voltage divider arranged to divide an alternating-current input voltage to produce a divided voltage;
      a high-pass filter arranged to pass a high-frequency component of the divided voltage to produce a monitoring voltage;
      a comparator arranged to compare the monitoring voltage with a threshold voltage to produce a comparison signal;
      a timer arranged to generate a timer signal indicating whether or not the comparison signal has been kept at a same logic level for a mask period;
      a controller arranged to generate a discharge control signal according to the timer signal; and
      a discharger arranged to discharge the X capacitor according to the discharge control signal,
   wherein the voltage divider includes:
      a first resistor connected between a node to which the alternating-current input voltage is applied and a node to which the divided voltage is applied; and a second resistor connected between the node to which the divided voltage is applied and a ground node, and
wherein the high-pass filter includes:
a first capacitor connected between the node to which the divided voltage is applied and a node to which the monitoring voltage is applied; and
a third resistor connected between the node to which the monitoring voltage is applied and the ground node,
wherein the resistance of the third resistor is lower than the resistance of the second resistor,
wherein a magnitude of an alternating-current component of the divided voltage is determined by a ratio of a resistance of the first resistor to a combined resistance of the second and third resistors, the alternating-current component being fed to the comparator via the first capacitor, and
wherein a magnitude of a direct-current component of the divided voltage is determined by a ratio of the resistance of the first resistor to the resistance of the second resistor irrespective of the third resistor, the direct-current component passing to the ground node via the first and second resistors and being isolated from the comparator by the first capacitor.

9. The power supply device according to claim 8, wherein the comparator, the timer, the controller, and the discharger are integrated into a semiconductor device which governs control of the DC/DC convertor circuit.

10. The power supply device according to claim 9, wherein
the semiconductor device has further integrated thereinto a starter circuit arranged to charge a supply voltage for the semiconductor device by receiving electric power from a stage preceding the rectifying-smoothing circuit, and
the controller discharges the X capacitor by repeating discharging of the supply voltage by the discharger and charging of the supply voltage by the starter circuit.

11. The power supply device according to claim 10, wherein
the semiconductor device has further integrated thereinto a comparator circuit arranged to monitor the supply voltage, and
the controller controls charging and discharging of the supply voltage according to an output of the comparator circuit.

12. The power supply device according to claim 10, further comprising:
a discharge assist resistor externally connected between a power terminal and a ground terminal of the semiconductor device, wherein the discharge assist resistor discharges the supply voltage from the power terminal to the ground terminal.

13. The power supply device according to claim 11, further comprising:
a discharge assist resistor externally connected between a power terminal and a ground terminal of the semiconductor device, wherein the discharge assist resistor discharges the supply voltage from the power terminal to the ground terminal.

* * * * *